United States Patent [19]

Coplan et al.

[11] 3,953,612

[45] Apr. 27, 1976

[54] PROCESS FOR PREPARING A FIBROUS PROTEIN PRODUCT AND THE PRODUCT THEREOF

[75] Inventors: Myron Julius Coplan, Natick; Robert Bernard Davis; Daniel Kenneth Schiffer, both of Framingham, all of Mass.

[73] Assignee: Miles Laboratories, Inc., Elkhart, Ind.

[22] Filed: Jan. 6, 1975

[21] Appl. No.: 538,820

[52] U.S. Cl. .............................. 426/104; 426/241; 426/506; 426/516; 426/802
[51] Int. Cl.² .......................................... A23J 3/00
[58] Field of Search .......... 426/104, 241, 137, 506, 426/802, 516; 264/176 F

[56] References Cited
UNITED STATES PATENTS

| | | | |
|---|---|---|---|
| 2,785,069 | 3/1957 | Dudman | 426/802 X |
| 3,800,053 | 3/1974 | Lange | 426/802 X |

*Primary Examiner*—James R. Hoffman
*Attorney, Agent, or Firm*—Louis E. Davidson

[57] ABSTRACT

A semi-unitary protein product consisting essentially of a bundle of intermittently fused parallel protein fibers which closely resembles the fibrous structure of natural meat can be prepared by heating a protein-water mixture to form an extrudable plastic mass and then extruding the mass under pressure through a spinneret having a plurality of closely-spaced orifices therein directly into a gaseous medium to yield the desired product.

14 Claims, No Drawings

PROCESS FOR PREPARING A FIBROUS PROTEIN PRODUCT AND THE PRODUCT THEREOF

BACKGROUND AND PRIOR ART

There has been a considerable effort in recent years to produce food products which simulate natural meat. Such products must have a textured structure which resembles the fibrous texture of natural products, such as animal meat, seafood and poultry. This texture has been sought in several ways. Protein fibers have been obtained by extruding an alkaline protein dispersion through a spinneret into an acid bath where the protein coagulates in the form of a tow of individual monofilaments. This tow can subsequently be used in the formation of simulated meat products. This technique has the disadvantages of requiring chemical treatment of the protein and its attendant complex equipment including apparatus for washing the fibers to remove the treating chemicals. Other techniques have also been suggested in the prior art for heating aqueous protein mixtures and extruding them into liquids or gases to form protein filaments. While filamentary products are achieved, the overall results do not closely resemble the fibrous structure of natural meat.

SUMMARY OF THE INVENTION

In accordance with the present invention, a process for the production of a semi-unitary protein product consisting essentially of a bundle of intermittently fused parallel protein fibers and which closely resembles the fibrous structure of a natural meat product is provided. This process comprises mixing a finely-divided oilseed protein material with water to form a mixture containing from about 25 to about 60 percent by weight of the protein material, heating the mixture to a temperature from about 100° C. to about 180° C. to form an essentially homogeneous, extrudable plastic mass and then extruding this mass under suitable pressure conditions through a spinneret directly into an essentially inert gaseous medium to yield the desired semiunitary protein product. The spinneret used has a plurality of orifices each having a cross-sectional dimension from about 0.001 to about 0.01 in., said orifices being spaced apart from each other a distance not greater than one orifice cross-sectional dimension.

DESCRIPTION OF THE INVENTION

The raw material suitable for use in this invention can be any oilseed protein. Protein materials obtained from soybeans, such as soybean concentrate, soybean isolate, and soy flour, are preferred. It is understood, however, that protein materials obtained from rapeseed, cottonseed, peanut and sesame seed can also be employed. It is further preferred that the oilseed protein be defatted. It is desirable that such protein material contain at least about 50 weight percent protein. Such protein material must also be functional. That is, it must not be denatured.

When the protein material is finely-divided, the small particle size contributes to improved process operation. It is preferred to have a protein material with an average particle size less than about 400 mesh. This means that most of the material will pass through a 400 mesh screen having openings of 37 microns.

The finely-divided protein material is mixed with water to form a mixture containing from about 25 to about 60 percent by weight of the protein material. If the protein material content is significantly below about 25 percent, the resulting fibers tend to be fragile and dough-like. If the protein material content is significantly above about 60 percent, the mixture is a dry crumb which requires undesirably high pressures to extrude. It is preferred that the mixture contain from about 35 to about 50 percent by weight of the protein material.

The protein-water mixture is then heated to form an essentially homogeneous extrudable plastic mass. The temperature should be from about 100° C. to about 180° C. At temperatures below about 100° C. the fibrous product formed is considered undesirably dough-like. At temperatures above about 180° C. there is undesirable degradation of the protein. Preferably, the temperature is from about 120° C. to about 165° C.

The above heating conditions can be achieved in several ways. The aqueous protein mixture can be passed through a suitable heat exchanger where it is heated by convection or conduction. While this method can be used, it has the disadvantage of non-uniform heating of the entire mixture. The preferred heating technique is the use of high frequency electromagnetic energy. The application of such energy having a frequency of about 1 to about 100 megahertz to the mixture will uniformly heat the mixture rapidly to the desired temperature without forming undesirable hot-spots. The actual power employed will be determined by the amount of material being heated.

The residence time in the heating zone is dependent on the temperature achieved. It is desired to have as short a time as possible in order to prevent undesirable denaturation of the protein. A residence time of a few seconds at about 150° C. is achieved using electromagnetic energy as the heating source.

It is important that the above-produced plastic mass contain no particles capable of plugging the subsequently used spinneret. This condition can be achieved in several ways. First, the starting material can be finely ground to the desired particle size. Second, the starting material can be classified to remove undesirable large particles. A preferred technique is to also employ a suitable filter immediately upstream of the spinneret through which the plastic mass is to flow. This filter, such as a porous mass of sintered metal particles, not only removes undesirably large particles but also provides additional shear to assist in the formation of the extrudable plastic mass.

The hot plastic mass is then forced under the above temperature conditions through a spinneret directly into a gaseous medium, such as air, which is essentially inert to the protein material at ambient conditions. The resulting cooling solidifies the fibers of the extruded bundle.

It has been found that the plastic mass can be forced through the spinneret under upstream pressure conditions from about 500 psi. to about 5,000 psi. The preferred pressure is from about 1,000 psi. to about 2,500 psi. When a filter is used, the above pressure conditions are maintained upstream of such filter.

The spinneret has a large number, such as from about 250 to about 12,000 or more, of closely spaced orifices therein. Each of the orifices has a minimum cross-sectional dimension of about 0.001 to about 0.01 in., preferably from about 0.003 to about 0.007 in. and a maximum cross-sectional dimension of about 0.01 in. The individual orifices are also spaced apart from each other a distance no greater than one orifice minimum cross-sectional dimension. When an elongated spinneret is employed, each of the substantially parallel capillary orifices also has a length:diameter ratio from about 10 to about 50. Preferably the length:diameter ratio is from about 10 to about 25.

The bundle of protein fibers exiting from the spinneret can be used "as-is" or it can be stretched over take-up rolls in a well-known manner to increase the tensile strength of the protein fibers. This fibrous protein product is described as a semi-unitary product because the individual protein filaments produced by each of the orifices in the spinneret are intermittently fused to adjacent filaments at a plurality of discontinuous contact locations. There is not continuous adherent contact along the entire length of each of the filaments. The resulting filament bundle structure closely resembles the fibrous structure of a natural meat product. It should be noted that this product structure is an improvement over the product obtained by prior art techniques for producing protein fibers wherein special care was taken to prevent any adherent contact between such fibers.

The invention will be described in further detail in the following examples.

EXAMPLE 1

Functional defatted soybean concentrate obtained by hexane and ethanol-water extraction of soybeans and containing about 70 weight percent protein was pulverized to an average particle size less than about 400 mesh. It was then mixed with water to form a mixture containing 45 weight percent of the defatted oilseed protein material. This mixture was fed by means of a feed pump at a pressure of 2,000 psi. to a heating chamber formed by a 10.75 in. long spiral wound fiberglass-epoxy tube with a 0.5 in. I.D. Teflon liner. Appropriate electrodes were located on the outside of the tube and were connected to a commercial radio-frequency heating generator. High frequency electromagnetic energy at about 90 megahertz and at 6,000 volts was passed through the mixture in the tube creating a uniform internal temperature in the mixture of about 150° C. This combination of heat and pressure formed a plastic mass of the aqueous protein mixture which then passed through a sintered stainless steel filter having openings of about 80 microns and then through an elongated spinneret. The total heating time was about 8 seconds. This spinneret was about 0.625 in. in diameter and contained 5,500 orifices each with a diameter of 0.005 in. Each orifice had a length diameter ratio of 25 and was located less than 0.005 in. from each adjacent orifice. The bundle of proteinaceous material exited from the spinneret into ambient air at a rate of about 6 lbs./hr. (2.72 kg./hr.). This bundle was a semiunitary plurifilamentary protein product having substantial cohesion between adjacent parallel protein filaments.

EXAMPLE 2

An aqueous mixture containing 41 weight percent of the protein material of Example 1 was heated at 900 psi. and extruded under the conditions of Example 1. A satisfactory product was obtained.

EXAMPLE 3

An aqueous mixture containing 35 weight percent of the protein material of Example 1 was fed by a piston extruder at a pressure of 1,000–2,400 psi. through a conduction heat exchanger having a temperature of 300° F. (149° C.) on the outer walls of the heat exchanger. The resulting plastic mass was then forced through the filter and spinneret described in Example 1 to form a desirable protein filament bundle.

EXAMPLE 4

An aqueous mixture containing 40 weight percent of the protein material of Example 1 was fed by a piston extruder at 177° C. and pressure of 1,000–2,000 psi. through a spinneret described in Example 1 but having a length: diameter ratio for the orifices of 10. Satisfactory protein filament bundle was obtained.

EXAMPLE 5

An aqueous mixture containing 50 weight percent of functional defatted soybean isolate containing over 90 weight percent protein and having an average particle size less than 400 mesh was fed by a piston extruder at 121° C. and 1000–4000 psi. through a filter and spinneret described in Example 1 to produce a satisfactory protein filament tow.

Utility of the product produced by the above-described process is shown in the following example.

EXAMPLE 6

The semi-unitary plurifilamentary protein product obtained from Example 1 was employed in an overall mixture containing protein fibers, heat coagulable binders and flavors to produce a simulated meat analog of satisfactory texture, flavor and mouth feel.

EXAMPLE 7

A commercially available soy flour containing about 50 weight percent protein was pulverized in an air mill to an average particle size of less than 400 mesh. It was then mixed with water to form a mixture containing 45 weight percent of the soy flour. This mixture was heated at 700 psi. and extruded under the conditions of Example 1. A satisfactory fibrous product was formed.

EXAMPLE 8

The apparatus of Example 1 was employed but the sintered metal filter was eliminated. The spinneret was partially occluded by a washer with a 0.25 in. diameter hole in the center. A 45 weight percent aqueous mixture of soy concentrate milled to pass through a 400 mesh screen was heated at 1,500 psi. and extruded as described in Example 1. A satisfactory fibrous product was formed. The product bundle was about 0.25 in. in overall diameter and was extruded at a linear velocity higher than than of Example 1.

EXAMPLE 9

The conditions of Example 1 were repeated employing an elongated spinneret having 12,000 orifices each with a cross-sectional dimension of about 0.005 in. Each orifice had a length:diameter ratio of 50 and was located less than 0.005 in. from each adjacent orifice. A satisfactory bundle of proteinaceous material was produced.

EXAMPLE 10

The conditions of Example 1 were repeated except that no filter was employed and the spinneret consisted of a metal screen having 100 micron (0.004 in.) openings each located less than 0.004 in. from each other. The screen was supported by a backing plate having a rectangular opening therein which was 0.125 in. wide and 0.5 in. long. The resulting satisfactory bundle of fibrous protein material had the above overall dimensions of the rectangular opening.

EXAMPLE 11

An aqueous mixture containing 45 weight percent of the protein material of Example 1 was extruded under the conditions of Example 1 through an elongated spinneret having 6450 orifices each with a diameter of 0.007 in. Each orifice had a length:diameter ratio of 25 and was located less than 0.007 in. from each adjacent orifice. The resulting protein filament bundle was similar to that produced by Example 1.

EXAMPLE 12

An aqueous mixture containing 45 weight percent of the protein material of Example 1 was extruded under the conditions of Example 1 through an elongated spinneret having 12,000 orifices each with a cross-sectional dimension of about 0.003 in. Each orifice had a length:diameter ratio of 25 and was located less than 0.003 in. from each adjacent orifice. A satisfactory bundle of fibrous protein material was produced.

While the above examples all employed a mixture of only water and the protein raw material, it is understood that the present invention can also employ aqueous starting material mixtures containing flavors, fats and binders in addition to the protein material.

What is claimed is:

1. A process for the production of a semi-unitary protein product consisting essentially of a bundle of intermittently fused protein fibers which comprises mixing a finely-divided oilseed protein material with water to form a mixture containing from about 25 to about 60 percent by weight of the protein material, heating the mixture to a temperature from about 100° C. to about 180° C. to form an essentially homogeneous, extrudable plastic mass and then extruding this mass under suitable pressure conditions through a spinneret directly into an essentially inert gaseous medium whereby there is intermittent fusing of the extruded protein fibers to yield the desired semi-unitary protein product, wherein such spinneret has a plurality of orifices each having a cross-sectional dimension from about 0.001 to about 0.01 in., said orifices being spaced apart from each other a distance not greater than one orifice cross-sectional dimension.

2. A process according to claim 1 wherein the protein material is soybean concentrate.

3. A process according to claim 1 wherein the protein material is soybean isolate.

4. A process according to claim 1 wherein the protein material is soy flour.

5. A process according to claim 1 wherein the mixture of protein material and water contains from about 35 to about 50 weight percent of the protein material.

6. A process according to claim 1 wherein the protein material has an average particle size less than about 400 mesh.

7. A process according to claim 1 wherein the protein material-water mixture is heated to a temperature from about 120° C. to about 165° C.

8. A process according to claim 1 wherein the mass is extruded under a pressure from about 500 psi. to about 5,000 psi.

9. A process according to claim 8 wherein the pressure is about 1,000 psi. to about 2,500 psi.

10. A process according to claim 1 wherein the heating of the protein material-water mixture is achieved by high frequency electromagnetic energy.

11. A process according to claim 10 wherein the electromagnetic energy has a frequency of about 1 to about 100 megahertz.

12. A process according to claim 1 wherein the orifices in the spinneret are elongated and substantially parallel and each have a diameter of about 0.003 to about 0.007 in. and have a length:diameter ratio from about 10 to about 50.

13. A process according to claim 12 wherein the orifices have a length:diameter ratio from about 10 to about 25.

14. A semi-unitary protein product prepared by the process of claim 1 and consisting essentially of a bundle of individual proteinaceous filaments each having a cross-sectional dimension of about 0.001 to about 0.01 in. and wherein each of the individual filaments are adhered to adjacent filaments at a plurality of discontinuous contact locations, such product closely resembling the fibrous structure of a natural meat product.

* * * * *